United States Patent
Hatano

(10) Patent No.: US 8,578,471 B2
(45) Date of Patent: *Nov. 5, 2013

(54) INFORMATION PROCESSING APPARATUS AND SECURITY PROTECTION METHOD

(75) Inventor: Ken Hatano, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/253,813

(22) Filed: Oct. 5, 2011

(65) Prior Publication Data

US 2012/0030755 A1 Feb. 2, 2012

Related U.S. Application Data

(63) Continuation of application No. 12/467,054, filed on May 15, 2009, now Pat. No. 8,087,077.

(30) Foreign Application Priority Data

Jun. 30, 2008 (JP) ................................ 2008-171202

(51) Int. Cl.
*G06F 21/00* (2013.01)

(52) U.S. Cl.
USPC ............. 726/16; 713/155; 713/156; 713/157; 713/158; 713/159; 726/17; 726/18; 726/19; 726/20

(58) Field of Classification Search
USPC .......................... 726/16–20, 27; 713/155–159
See application file for complete search history.

(56) References Cited

U.S. PATENT DOCUMENTS

| | | |
|---|---|---|
| 6,615,264 B1 | 9/2003 | Stoltz et al. |
| 7,161,468 B2 | 1/2007 | Hwang et al. |
| 2002/0129248 A1* | 9/2002 | Wheeler et al. ............... 713/170 |
| 2003/0135471 A1 | 7/2003 | Jaquier et al. |
| 2004/0172535 A1 | 9/2004 | Jakobsson et al. |
| 2005/0144484 A1 | 6/2005 | Wakayama |

(Continued)

FOREIGN PATENT DOCUMENTS

| | | |
|---|---|---|
| JP | 2003-122444 | 4/2003 |
| JP | 2003-283492 | 10/2003 |

(Continued)

OTHER PUBLICATIONS

Notice of Reasons for Rejection mailed by Japan Patent Office on Aug. 11, 2009 in the corresponding Japanese patent application No. 2008-171202.

*Primary Examiner* — Ghazal Shehni
(74) *Attorney, Agent, or Firm* — Knobbe, Martens, Olson & Bear LLP

(57) ABSTRACT

According to one embodiment, an information processing apparatus includes an input to input a password, a biological authentication device including a storage unit for storing biological information and identification information, and an authentication controller. The authentication controller sets and holds identification information to be stored in the storage unit of the biological authentication device, and permits a password input using the input to be substituted by authentication using the biological authentication device when the identification information held by itself and the identification information stored in the storage unit of the biological authentication device match. The authentication controller includes a setter to perform a setting for the identification information stored in the storage unit of the biological identification device and held by itself, on both conditions of authentication establishment with a registered password entry using the input and authentication establishment using the biological authentication device.

4 Claims, 3 Drawing Sheets

(56) References Cited

U.S. PATENT DOCUMENTS

2006/0005025 A1* 1/2006 Okada et al. ............ 713/168
2007/0050640 A1 3/2007 Matsuoka
2008/0172725 A1* 7/2008 Fujii et al. ............... 726/5

FOREIGN PATENT DOCUMENTS

| | | |
|---|---|---|
| JP | 2004-227589 | 8/2004 |
| JP | 2007-090845 | 4/2007 |
| JP | 2007-179212 | 7/2007 |

* cited by examiner

INFORMATION PROCESSING APPARATUS AND SECURITY PROTECTION METHOD

CROSS-REFERENCE TO RELATED APPLICATIONS

This application is a continuation of U.S. patent application Ser. No. 12/467,054, filed May 15, 2009, entitled "INFORMATION PROCESSING APPARATUS AND SECURITY PROTECTION METHOD," which is hereby incorporated by reference herein in its entirety. Further, U.S. patent application Ser. No. 12/467,054 is based upon and claims the benefit of priority from Japanese Patent Application No. 2008-171202, filed Jun. 30, 2008, the entire contents of which are incorporated herein by reference.

BACKGROUND

1. Field

One embodiment of the present invention relates to a security protection technology suitable for being applied to a personal computer or the like including a function of substituting fingerprint authentication for password entry.

2. Description of the Related Art

Recently, various types of personal computers, such as notebook-type computers and desktop-type computers, are widely used. Along with the popularization of these personal computers, awareness of information leaks prevention has been raised. Under the circumstances, various approaches relating to security protection for computers have been proposed (e.g., Jpn. Pat. Appin. KOKAI Publication No. 2003-122444).

Also, authentication technologies utilizing biological information have been gathering attention recently. For example, reading of a fingerprint, no two are ever the same, enables to start a computer without entering a password which is at risk of being stolen. In other words, all kinds of efforts have been made in order to improve both security strength and convenience in such authentication technologies.

Fingerprint information of a user is registered to the above-mentioned fingerprint authentication device for performing authentication by matching a fingerprint. Also, identification information is registered to the fingerprint authentication device in order to deal with such a case as the fingerprint authentication device itself is abusively exchanged. For example, a BIOS (basic input/output system), which requires password entry for authenticating a user, checks the identification information, and permits, when the identification information is verified, the user to start a computer with approval of the authentication using the fingerprint authentication device, instead of password entry. With this mechanism, an invalid user who abusively exchanges the fingerprint authentication device with a fingerprint authentication device to which fingerprint information of the invalid user is registered is to be required to enter a password. It is because the BIOS does not permit starting of the computer without approval of authentication by the fingerprint authentication device whose identification information is verified, even if the invalid user has his/her fingerprint read.

Establishing correspondence of identification information between a BIOS and a fingerprint authentication device with respect to an individual computer is difficult to be performed at the time of shipment. Therefore, correspondence of identification information is established between a BIOS and a fingerprint authentication device in such a manner that, when a valid password is entered to start a computer, the BIOS sets the identification information and both of the BIOS and the fingerprint authentication device hold the identification information.

Based on the basic principle of the establishment of correspondence of identification information, again, the case wherein the fingerprint authentication device is replaced by a fingerprint authentication device to which fingerprint information of an invalid user is registered is assumed. It is assumed herein that the invalid user let a valid user use the computer with the replaced fingerprint authentication device. In that case, the valid user is required to enter the password because authentication using a read fingerprint of the valid user will not be approved due to mismatch of identification information. If the valid user, being unaware of the replacement of the fingerprint authentication device, believes that reading of the fingerprint is simply failed and enters a valid password to start the computer, correspondence of identification information is to be established between the replaced fingerprint authentication device and the BIOS. As a result, when the invalid user has his/her fingerprint read after the valid user terminates the use of the computer, the invalid user is able to start the computer without entering the password.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes an input module to input a password, a biological authentication device including a storage unit for storing biological information and identification information, and an authentication control module which sets and holds identification information to be stored in the storage unit of the biological authentication device, and permits a password input using the input module to be substituted by authentication using the biological authentication device when the identification information held by itself and the identification information stored in the storage unit of the biological authentication device match. The authentication control module includes a setting module to perform a setting for the identification information stored in the storage unit of the biological identification device and held by itself, on both conditions of authentication establishment with a registered password entry using the input module and authentication establishment using the biological authentication device.

First of all, a configuration of an information processing apparatus according to an embodiment of the invention will be explained with reference to FIG. 1 and FIG. 2. The information processing apparatus of the embodiment is realized as, for example, a notebook computer 10.

Figure 1:
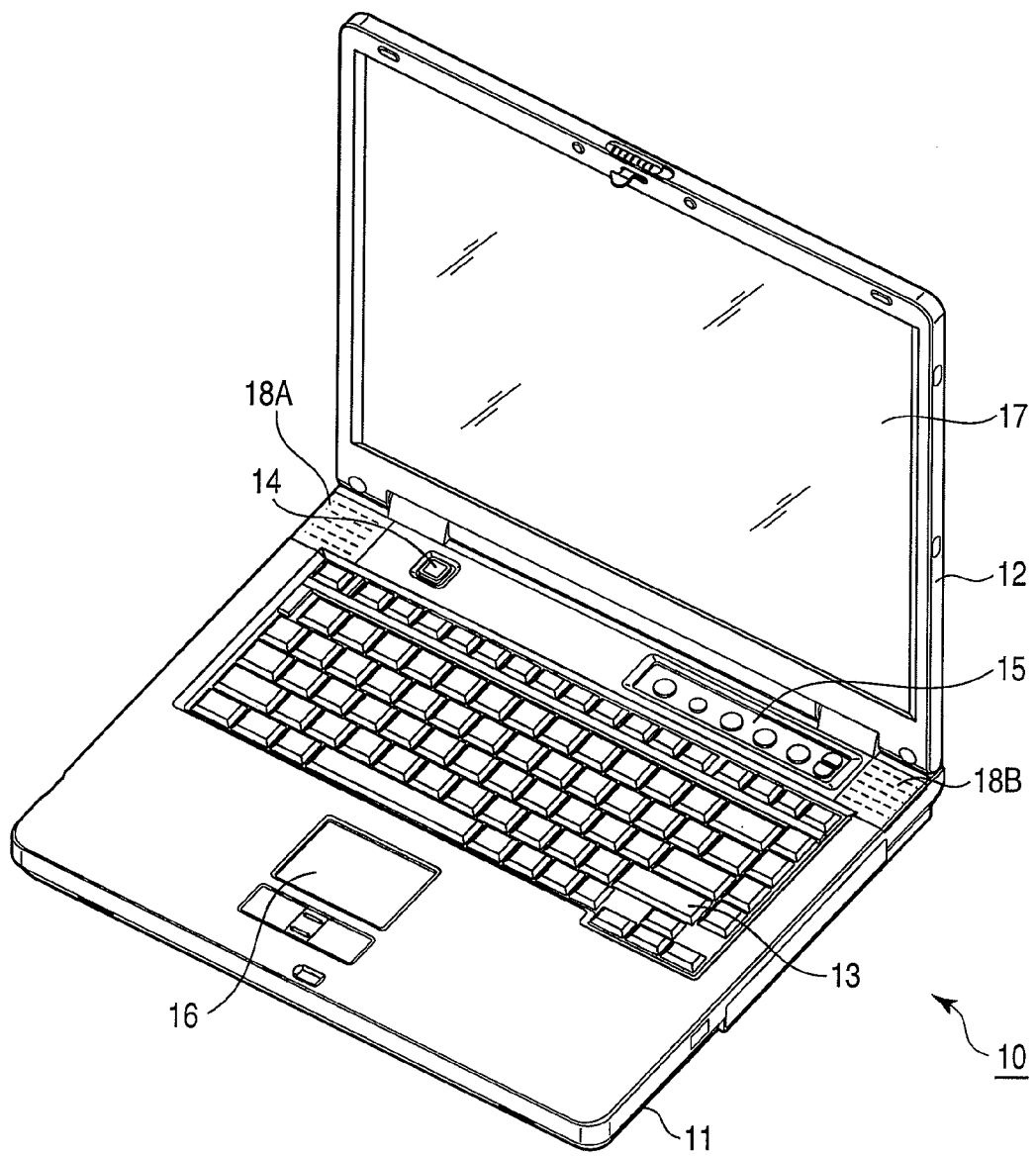
FIG. 1 is an exemplary perspective view showing an appearance of an information processing apparatus according to an embodiment of the invention.

FIG. 1 is an exemplary perspective view showing the computer 10 when a display unit is opened. The computer 10 has a computer body 11 and a display unit 12. The display unit 12 incorporates a display device including an LCD (liquid crystal display) 17.

The display unit 12 is attached to the computer body 11 in such a manner that the display unit 12 is rotatable between an open position where a top surface of the computer body 11 is exposed and a closed position where the top surface of the computer body 11 is covered. The computer body 11 has a thin, box-shaped chassis, and a keyboard 13, a power button 14 for powering ON/OFF the computer 10, an input operation panel 15, a touch pad 16, speakers 18A and 18B, a fingerprint authentication device 111, etc. are arranged thereon. The input operation panel 15 is an input device and includes buttons for inputting an event: for example, a button for immediately starting a TV function showing and recording of broadcast program data broadcasted by a television broadcast signal, and a button for immediately starting a function playing video data recorded on a DVD (Digital Versatile Disc).

The fingerprint authentication device 111 reads a fingerprint of a user and compares the read fingerprint with preliminarily registered fingerprint information of a valid user for determining whether or not the user tying to use the computer 10 is the valid user. When the power button 14 is pressed under the condition that the fingerprint authentication device 111 is set active, the computer 10 displays a requirement for having the user's fingerprint read by the fingerprint authentication device 111 on the LCD 17 instead of displaying a requirement for entering a password. The user is able to start the computer 10 without entering a password with the keyboard 13, by having his/her fingerprint read and compared with the preliminarily registered fingerprint information by the fingerprint authentication device 111 in response to the requirement.

If authentication by the fingerprint authentication device 111 fails more than a specified number of times, the fingerprint authentication device 111 does not approve authentication anymore, and the requirement for entering a password with the keyboard 13 is displayed on the LCD 17. The user is able to start the computer 10 if he/she enters the valid password. However, if the user incorrectly enters passwords more than a specified number of times, the computer 10 is forcibly powered OFF for the purpose of security protection.

As mentioned above, the computer 10 is equipped with a mechanism realizing improvement in security related to the fingerprint authentication device 111 which is important for enabling to bypass password entry. Now, this mechanism will be described in detail.

A system configuration of the computer 10 will be explained with reference to FIG. 2.

Figure 2:
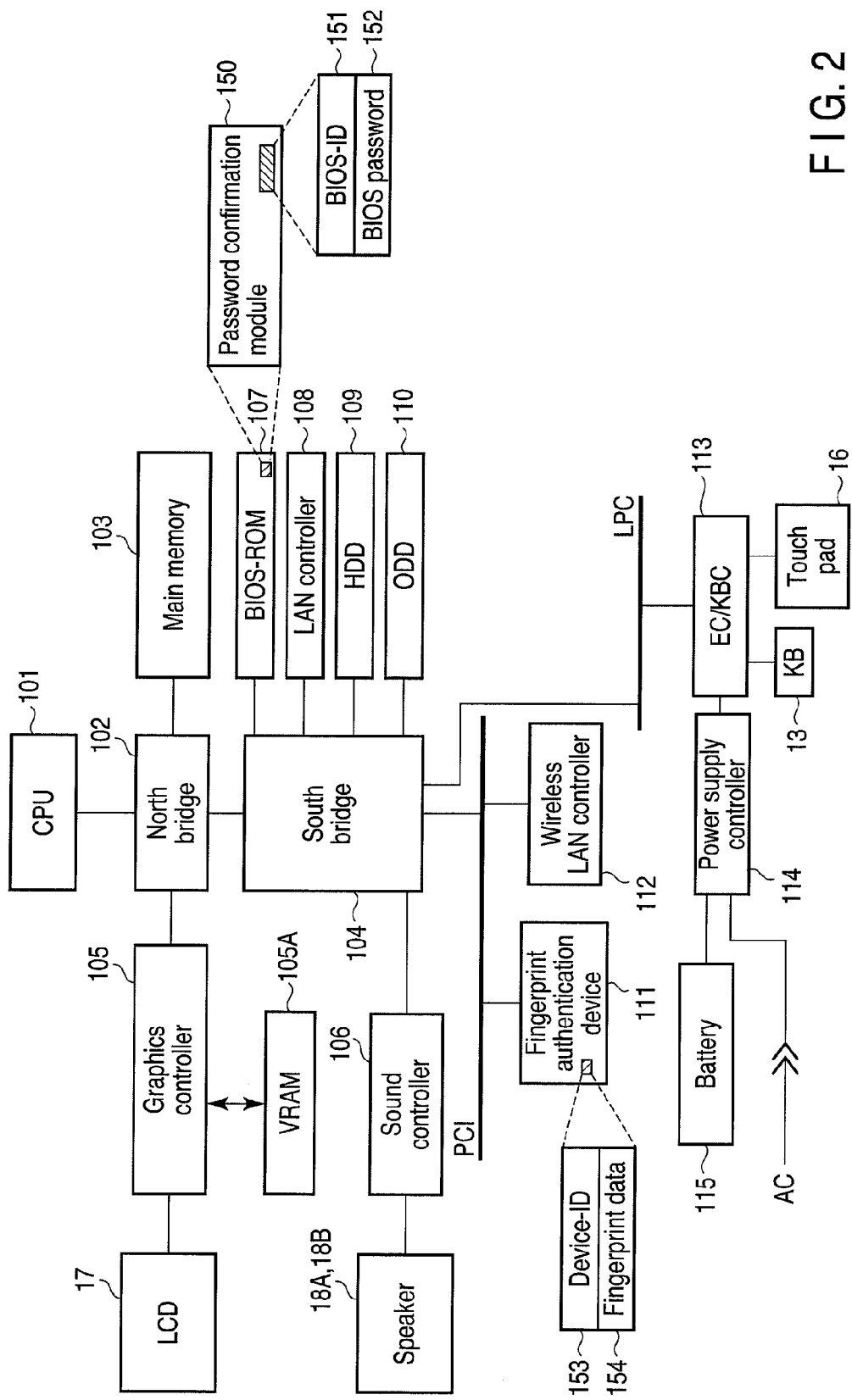
FIG. 2 is an exemplary block diagram showing a system configuration of the information processing apparatus according to the embodiment.

As shown in FIG. 2, the computer 10 includes a CPU 101, a north bridge 102, a main memory 103, a south bridge 104, a graphics controller 105, a video memory (VRAM) 105A, a sound controller 106, a BIOS-ROM 107, a LAN controller 108, a hard disk drive (HDD) 109, an optical disc drive (ODD) 110, the fingerprint authentication device 111, a wireless LAN controller 112, an embedded controller/keyboard controller (EC/KBC) 113, a power supply controller 114, and a battery 115, and the like.

The CPU 101 is a processor controlling operation of the computer 10, and executes an operating system (OS) and various application programs (including utilities) operated on the OS loaded from the HDD 109 onto the main memory 103. The CPU 101 also executes a BIOS stored in the BIOS-ROM 107. The BIOS is a program for hardware control. Hereinafter, the BIOS stored in the BIOS-ROM 107 is often indicated as the BIOS 107.

The north bridge 102 is a bridge device connecting a local bus of the CPU 101 and the south bridge 104. The north bridge 102 incorporates a memory controller which access controls the main memory 103. Also, the north bridge 102 includes a function for executing communications with the graphics controller 105 via a PCI EXPRESS serial bus or the like.

The graphics controller 105 is a display controller which controls the LCD 17 used as a display monitor of the computer 10. A display signal generated by this graphics controller 105 is sent to the LCD 17.

The south bridge 104 controls devices on the PCI (Peripheral Component Interconnect) bus and those on the LPC (Low Pin Count) bus. Also, the south bridge device incorporates an IDE (Integrated Drive Electronics) controller for controlling the HDD 109 and the ODD 119. Furthermore, the south bridge 104 includes a function for executing communications with the sound controller 106 and the LAN controller 108.

The sound controller 106 is a sound device, which outputs reproduction-target audio data to the speakers 18A and 18B. The LAN controller 108 is a wire communication device for executing wire communications of, for example, Ethernet®. The wireless LAN controller 112 is a wireless communication device for executing wireless communications of, for example, IEEE 802.11.

The EC/KBC 113 is a one-chip microcomputer on which an embedded controller for power management, and a keyboard controller controlling a keyboard (KB) 13 and a touch pad 16 are integrated. The EC/KBC 113 executes control for supplying electric power from a battery 115 and AC adapter to each part in cooperation with the power supply controller 114.

The computer 10 having the above-mentioned configuration has the following security protection mechanism: For the purpose of determining whether or not a user is a valid user when the power button 14 is pressed, the user is (1) required to enter a password with the keyboard 13, and (2) required to have his/her fingerprint read by the fingerprint authentication device 111. In order to control this security protection mechanism, the BIOS 107 incorporates a password confirmation module 150.

The password confirmation module 150 holds a BIOS-ID 151 and a BIOS password 152. Also, the fingerprint authentication device 111 includes a nonvolatile memory for storing a device-ID 153 and a fingerprint data 154. The password confirmation module 150 compares the BIOS-ID 151 which is held by itself and the device-ID 153 which is stored by the fingerprint authentication device 111 in the nonvolatile memory. Then, the fingerprint authentication device 111 approves authentication when values of the both the BIOS-ID 151 and the device-ID 153 match, thereby permitting the user to start the computer 10. According to the present embodiment, the password confirmation module 150 sets a device-ID given to the computer 10 as identification information to be shared with fingerprint authentication device 111. This device-ID is possessed as the BIOS-ID 151 and supplied to the fingerprint authentication device 111 under certain conditions. The fingerprint authentication device 111 stores the supplied device-ID as the device-ID 153 in the nonvolatile memory.

More specifically, the password confirmation module 150 does not approve authentication using the fingerprint authentication device 111 when the BIOS-ID 151 and the device-ID 153 do not match, and (in order to keep the fact of identification information mismatch secret, the module 150 makes authentication end up in failure after fingerprint reading and) requires entry of the BIOS password 152. However, the confirmation module 150 does not supply the fingerprint authentication device 111 with the device-ID at a point in time when the user correctly enters the BIOS password 152, and further requires the user to have his/her fingerprint read by the fingerprint authentication device 111. Then, the password confirmation module 150 supplies the fingerprint authentication device 111 with the device-ID when authentication by the fingerprint authentication device 111 is approved.

For example, a case where a computer is started by entering a valid password after the shipment is assumed. A correspondence of identification information between the BIOS 107 and the fingerprint authentication device 111 is not yet established by this password entry. A correspondence between the two is to be established when the power button 14 is pressed subsequent to the registration of fingerprint information to the fingerprint authentication device 111, and both conditions of (1) the valid password entry and (2) approval of authentication by the fingerprint authentication device 111 are satisfied. Incidentally, for example, zero or null-value is stored as the device-ID 153 in the nonvolatile memory of the fingerprint authentication device 111 at the time of shipment. When these values are stored in the nonvolatile memory, the password confirmation module 150 determines that a correspondence of the identification information is not yet established.

On the basis of the above, a case where an invalid user replaces the fingerprint authentication device 111 with another fingerprint authentication device 111 to which fingerprint information of the invalid user's is registered and lets a valid user use the computer 10 is considered.

When the fingerprint authentication device 111 is replaced, authentication by the fingerprint authentication device 111 ends up in failure in spite of the user's having his/her fingerprint read in the usual way because the BIOS-ID 151 and the device-ID 153 do not match and the device 111 does not approve authentication. So, a case in which the user being required to enter a password thinks that the fingerprint reading is merely failed and enters the BIOS password 152 is assumed.

Due to the correct entry of the BIOS password 152, authentication is approved. However, the computer 10 again requires the user to have his/her fingerprint read by the fingerprint authentication device 111 in order to confirm whether or not there is a correspondence of the identification information between the BIOS 107 and the fingerprint authentication device 111. Then the user has his/her fingerprint read by the fingerprint authentication device 111. However, authentication is to end up in failure because fingerprint data 154 of the invalid user is stored in the nonvolatile memory of the device 111. Therefore, even though the computer 10 approves the user to start the computer 10, it does not establish a correspondence of the identification information between the BIOS 107 and the fingerprint authentication device 111, that is to say, it does not supply the fingerprint authentication device 111 with the device-ID.

With the above processes, the computer 10 is able to make authentication end up in failure even if the invalid user tries authentication using the fingerprint authentication device 111 after the valid user terminated the use of the computer 10, thereby realizing prevention of computer abuse. Also, in order to confirm whether it is OK to establish a correspondence of the identification information, when the user again has his/her fingerprint read by the fingerprint authentication device 111 and authentication ends up in failure, the computer 10 displays (to a user who is able to correctly enter the BIOS password 152) a message on the LCD 17 for warning that there is a possibility of the fingerprint authentication device 111 being abusively replaced. In response to the warning, the user may have realized that he or she has been tricked by replacement of the fingerprint authentication device 111.

Figure 3:
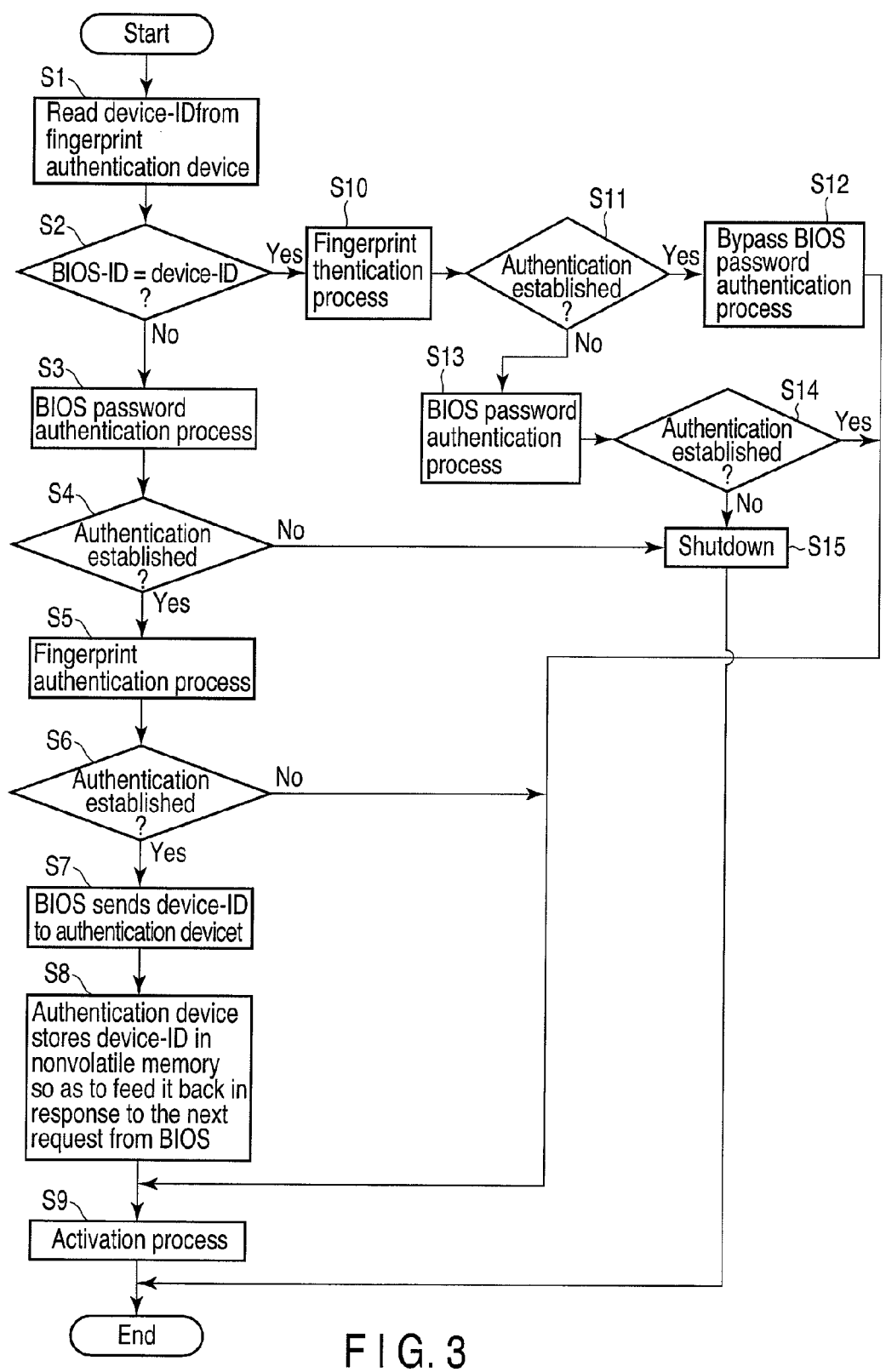
FIG. 3 is an exemplary flowchart showing a processing flow of user authentication in the information processing apparatus according to the embodiment.

FIG. 3 is an exemplary chart showing a processing flow of the computer 10 during user authentication.

The password confirmation module 150 of the BIOS 107 reads the device-ID 153 from the fingerprint authentication device 111 (block 51) and checks whether or not the device-ID 153 matches the BIOS-ID 151 held by itself (block S2). If the two IDs match (YES in block S2), the password confirmation module 150 approves authentication by the fingerprint authentication device 111 (block S10), and when the authentication is established (YES in block S11), bypasses authentication by entering the BIOS password 152 (block S12), and then the BIOS 107 executes a start process (block S9).

When authentication by the fingerprint authentication device 111 ends up in failure (NO in block S11), the password confirmation module 150 performs authentication by entering the BIOS password 152 (block S13). Then, the BIOS 107 executes the start process (block S9) when the authentication is established (block S14), and forcibly powers OFF (block S15) when the authentication is not established (NO in block S14).

Furthermore, the password authentication module 150, when the device-ID 153 read out from the fingerprint authentication device 111 and the BIOS-ID 151 held by itself do not match (NO in block S2), does not approve authentication by the fingerprint authentication device 111 and performs authentication by entering the BIOS password 152 (block S3). If the authentication ends up in failure (NO in block S4), BIOS 107 forcibly powers OFF the computer 10 (block S15).

When the authentication by entering the BIOS password 152 is established (YES in block S4), the password confirmation module 150 then executes authentication by the fingerprint authentication device 111 (block S5). If this authentication is established (YES in block S6), the password confirmation module 150 supplies the device-ID of the computer 10 to the fingerprint authentication device 111. In response to the supply of the device-ID, the fingerprint authentication device 111 stores its value in the nonvolatile memory (block S8). With the above processes, a correspondence of the identification information is established. After the completion of the establishment of the correspondence, the BIOS 107 executes the start process (block S9).

As explained above, when the BIOS-ID 151 and the device-ID 153 do not match (NO in block S2), the computer 10 executes establishment of a correspondence of the identification information based on both conditions of authentication establishment by entering the BIOS password 152 (YES in block S4) and authentication establishment by the fingerprint authentication device 111 (YES in block S6). Therefore, the computer 10 is able to realize improvement in security protection relating to use of a biological authentication device (fingerprint authentication device 111).

Although the fingerprint authentication device 111 is explained as an example herein, the present invention is not limited to this. The method disclosed in the present invention can be applied to any other biological authentication devices performing authentication using biological information. Also, although the BIOS password is taken as an example for which the biological authentication device is substituted, the present invention is not limited to this. The method disclosed in the present invention can be applied to cases in which any other authentication information is a substitution target.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
an input configured to receive a password for authenticating users who can utilize the information processing apparatus;
a biometric authentication device comprising a storage configured to store biometric information in order to authenticate users who can utilize the information processing apparatus, wherein the biometric authentication device authenticates a user who inputs his or her biometric information as the user who can utilize the information processing apparatus if the input biometric information corresponds to the biometric information stored in the storage, the storage being further configured to store identification information to determine whether or not the authentication using the password via the input can be substituted by the authentication using the biometric information performed by the biometric authentication device; and
an authentication controller configured to set and retain the identification information to be stored in the storage of the biometric authentication device if the authentication using the password via the input is successful and the authentication using the biometric information performed by the biometric authentication device is successful, and to permit substituting the authentication using the password via the input by the authentication using the biometric information performed by the biometric authentication device if the identification information held in the authentication controller and the identification information stored in the storage of the biometric authentication device match.

2. The apparatus of claim 1, wherein the authentication controller is configured to substitute the authentication using the biometric information performed by the biometric authentication device for the authentication using the password via the input, and to perform the authentication using the password via the input if the authentication by the biometric authentication device is not successful because the input biometric information does not correspond to the biometric information stored in the storage.

3. The apparatus of claim 1, wherein the authentication controller is configured to perform the authentication using the password via the input if the identification information held in the authentication controller and the identification information stored in the storage of the biometric authentication device do not match.

4. The apparatus of claim 1, wherein the authentication controller further comprises a notifier configured to output a message of warning about a possibility of the biometric authentication device being replaced without authorization, if the authentication by the biometric authentication device is not successful because the identification information in the information processing apparatus and the identification information stored in the storage of the biometric authentication device do not match.

* * * * *